United States Patent
Kauffmann et al.

(10) Patent No.: US 10,482,359 B2
(45) Date of Patent: Nov. 19, 2019

(54) SYSTEMS AND METHODS FOR REMOVING NON-STATIONARY OBJECTS FROM IMAGERY

(71) Applicant: Google LLC, Mountain View, CA (US)

(72) Inventors: Alejandro Kauffmann, San Francisco, CA (US); Ashley Ma, San Francisco, CA (US); William Lindmeier, San Francisco, CA (US); Andrew Dahley, San Francisco, CA (US); Mark Ferdinand Bowers, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/874,101

(22) Filed: Jan. 18, 2018

(65) Prior Publication Data
US 2019/0220713 A1    Jul. 18, 2019

(51) Int. Cl.
| | |
|---|---|
| *G06K 15/02* | (2006.01) |
| *G06K 9/00* | (2006.01) |
| *G06T 5/00* | (2006.01) |
| *G06T 5/50* | (2006.01) |
| *G06T 11/60* | (2006.01) |
| *H04N 5/232* | (2006.01) |

(52) U.S. Cl.
CPC ..... *G06K 15/1867* (2013.01); *G06K 9/00624* (2013.01); *G06T 5/005* (2013.01);
(Continued)

(58) Field of Classification Search
CPC .................. G06K 15/1867; G06K 9/00624
(Continued)

(56) References Cited

U.S. PATENT DOCUMENTS

| | | | |
|---|---|---|---|
| 6,987,535 B1 * | 1/2006 | Matsugu | G06F 3/04845 348/239 |
| 9,641,818 B1 | 2/2017 | Sharma et al. | |

(Continued)

FOREIGN PATENT DOCUMENTS

| | | |
|---|---|---|
| EP | 2110738 | 10/2009 |
| GB | 2537886 | 2/2016 |
| WO | WO2013117961 | 8/2013 |

OTHER PUBLICATIONS

International Search Report and Written Opinion for PCT/US2018/047059, dated Nov. 27, 2018, 15 pages.
(Continued)

*Primary Examiner* — Sinh Tran
*Assistant Examiner* — Zhenzhen Wu
(74) *Attorney, Agent, or Firm* — Dority & Manning, P.A.

(57) ABSTRACT

The present disclosure provides image capture devices and associated methods of operation that enable the interactive editing of imagery, including, for example, removal and/or addition of non-stationary objects from and/or to captured imagery. According to one example aspect of the present disclosure, an image capture device can capture a plurality of frames of imagery that depict a scene and, while capturing the plurality of frames of imagery, provide a composite image within a viewfinder of the image capture device, where non-stationary objects included in the scene are removed from the composite image. According to another example aspect of the present disclosure, the image capture device can allow a user to edit a final composite image directly within the viewfinder. Thus, the present disclosure provides systems and methods that enable enhanced capture and interactive editing of imagery.

19 Claims, 6 Drawing Sheets

(52) U.S. Cl.
CPC ................ *G06T 5/50* (2013.01); *G06T 11/60* (2013.01); *H04N 5/232* (2013.01); *G06T 2207/10016* (2013.01); *G06T 2207/10024* (2013.01); *G06T 2207/20024* (2013.01); *G06T 2207/20221* (2013.01)

(58) Field of Classification Search
USPC ........................................................ 348/218.1
See application file for complete search history.

(56) References Cited

U.S. PATENT DOCUMENTS

| | | | | |
|---|---|---|---|---|
| 2008/0052945 | A1* | 3/2008 | Matas | G06F 3/0485 |
| | | | | 34/173 |
| 2009/0256947 | A1* | 10/2009 | Ciurea | G06F 3/0488 |
| | | | | 348/333.12 |
| 2010/0271498 | A1* | 10/2010 | Hwang | G06T 5/50 |
| | | | | 348/222.1 |
| 2013/0058568 | A1* | 3/2013 | Itoh | H04N 1/60 |
| | | | | 382/165 |
| 2014/0181745 | A1 | 6/2014 | Cui | |
| 2014/0376830 | A1* | 12/2014 | Hyvarinen | G06K 9/00208 |
| | | | | 382/284 |
| 2017/0289513 | A1* | 10/2017 | Sharma | H04N 9/74 |

OTHER PUBLICATIONS

Agular, "Remove Moving Objects & Unwanted People from Photos on Your Galaxy S5", https://gs5.gadgethacks.com/how-to/remove-moving-objects-unwanted-people-from-photos-your-galaxy-s5-0154927/, retrieved on Jan. 18, 2018, 5 pages.

Apple Developer, "Advances in CoreImages: Filters, Metal, Vision, and More", https://developer.apple.com/videos/play/wwdc2017/510/, retrieved on Jan. 18, 2018, 1 page.

Blackberry, "How to Demo Time Shift Mode", http://demos.blackberry.com/blackberry-z10/na/us/gen/how-to/media/camera/time-shift-mode/index.html, retrieved on Jan. 18, 2018, 1 page.

Cozma, "Easily Remove Unwanted Objects from Photos on Android, iOS" May 11, 2012, https://www.cnet.com/how-to/easily-remove-unwanted-objects-from-photos-on-android-ios/, retrieved on Jan. 18, 2018, 7 pages.

Gray. "Magically Remove Unwanted Moving Object from Your Pictures with Remove by Scalado", Feb. 14, 2017, https://androidandme.com/2012/02/applications/magically-remove-unwanted-moving-object-from-your-pictures-with-remove-by-scalado/, retrieved on Jan. 18, 2018, 10 pages.

Shoe, "Remove Unwanted Objects from Photos", https://helpx.adobe.com/photoshop/how-to/remove-object-content-aware.html, retrieved on Jan. 18, 2018, 3 pages.

Samsung, "How do I use the Burst Shot Mode and Best Photo Feature on my Samsung Galaxy S III?", https://www.samsung.com/us/support/answer/ANS00022081/, retrieved on Jan. 18, 2018, 3 pages.

Snapchat, "Magic Eraser", https://support.snapchat.com/en-US/a/magic-eraser, retrieved on Jan. 18, 2018, 1 page.

TechCrunch, "Snapchat's New Eraser Lets You 'Photoshop' Stuff Out of Photos", https://techcrunch.com/2017/05/09/snapchat-magic-eraser/, retrieved on Jan. 18, 2018, 8 pages.

\* cited by examiner

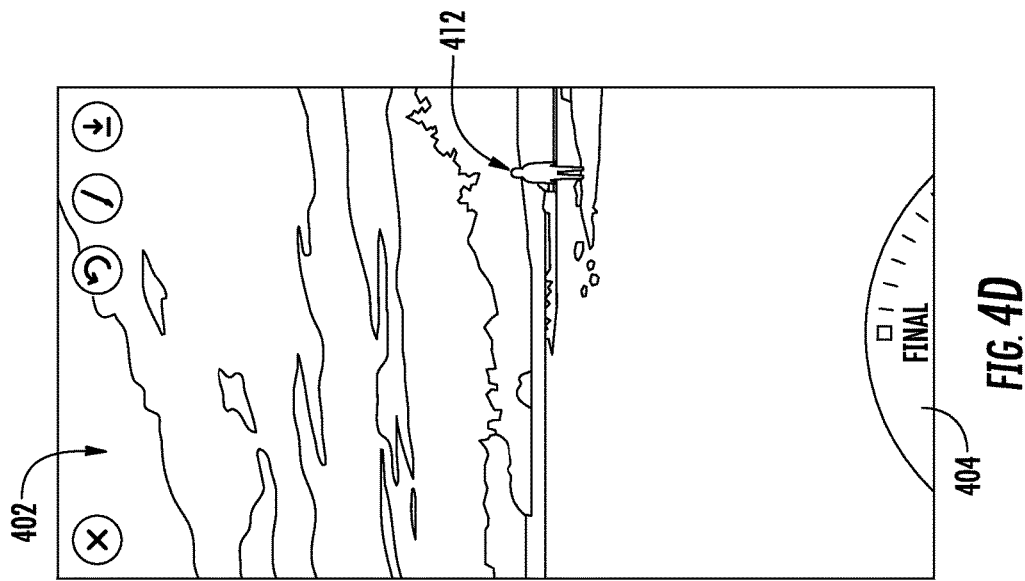
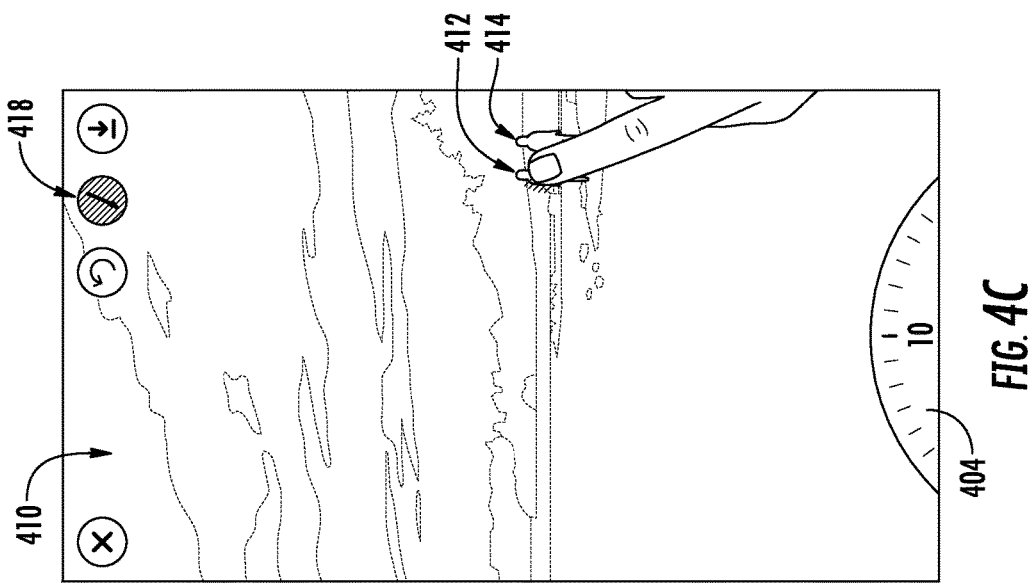

SYSTEMS AND METHODS FOR REMOVING NON-STATIONARY OBJECTS FROM IMAGERY

FIELD

The present disclosure relates generally to systems and methods that capture and process imagery. More particularly, the present disclosure relates to image capture devices and associated methods of operation that enable the interactive editing of imagery, including, for example, removal and/or addition of non-stationary objects from and/or to captured imagery.

BACKGROUND

An image capture device is a device that can capture imagery (e.g., in the form of image frames). Image capture devices include cameras, recorders, sensors, and/or other devices. In some instances, image capture devices can have a primary purpose other than capturing imagery. For example, image capture devices can include devices that are "camera-enabled" or have an image capture system embedded within the device such as, for example, certain smartphones, laptops, smart appliances, smart speakers, home manager devices, security systems, and the like. In some instances, image capture devices can be mobile image capture devices that are capable of being moved and/or image capture devices that are capable of being worn. Furthermore, computing systems that do not explicitly capture imagery themselves can still be used to view, edit, or display imagery captured by an image capture device.

SUMMARY

Aspects and advantages of embodiments of the present disclosure will be set forth in part in the following description, or can be learned from the description, or can be learned through practice of the embodiments.

One example aspect of the present disclosure is directed to an image capture device. The image capture device includes an image capture system configured to capture frames of imagery. The image capture device includes a viewfinder configured to display at least a portion of a field of view of the image capture device. The image capture device includes one or more processors and one or more non-transitory computer-readable media that collectively store instructions that when executed by the one or more processors cause the image capture device to perform operations. The operations include capturing a plurality of frames of imagery that depict a scene. The operations include, while capturing the plurality of frames of imagery and for each of a plurality of iterations: generating a composite image from the plurality of frames of imagery. Generating the composite image includes removing from the composite image one or more non-stationary objects included in the scene. The operations include, while capturing the plurality of frames of imagery and for each of the plurality of iterations: providing the composite image for display in the viewfinder.

Another example aspect of the present disclosure is directed to one or more non-transitory computer-readable media that collectively store instructions that when executed by one or more processors of a computing system cause the computing system to perform operations. The operations include obtaining a plurality of frames of imagery that depict a scene. The operations include generating a final composite image. Generating the final composite image includes removing from the final composite image non-stationary objects included in the scene. The operations include receiving a first user input that selects a first frame of imagery from the plurality of frames of imagery. The operations include providing the first frame of imagery for display. The operations include receiving a second user input relative to a first location within the first frame of imagery. The operations include, in response to receipt of the second user input, modifying the final composite image to depict at least a first non-stationary object depicted at the first location in the first frame of imagery.

Another example aspect of the present disclosure is directed to an apparatus. The apparatus includes one or more processors and one or more non-transitory computer-readable media that collectively store instructions that when executed by the one or more processors cause the apparatus to: obtain a plurality of image frames depicting a scene; for each of plural pixel positions in the image frames of the plurality of image frames, identify a pixel value at the pixel position in one of the image frames of the plurality of image frames that is the most similar in color to the pixel values at the pixel position in the other image frames of the plurality of image frames; and generate a composite image using the pixel values identified for each of the plural pixel positions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 4A-D depict example user interfaces according to example embodiments of the present disclosure.

DETAILED DESCRIPTION

Figure 1:
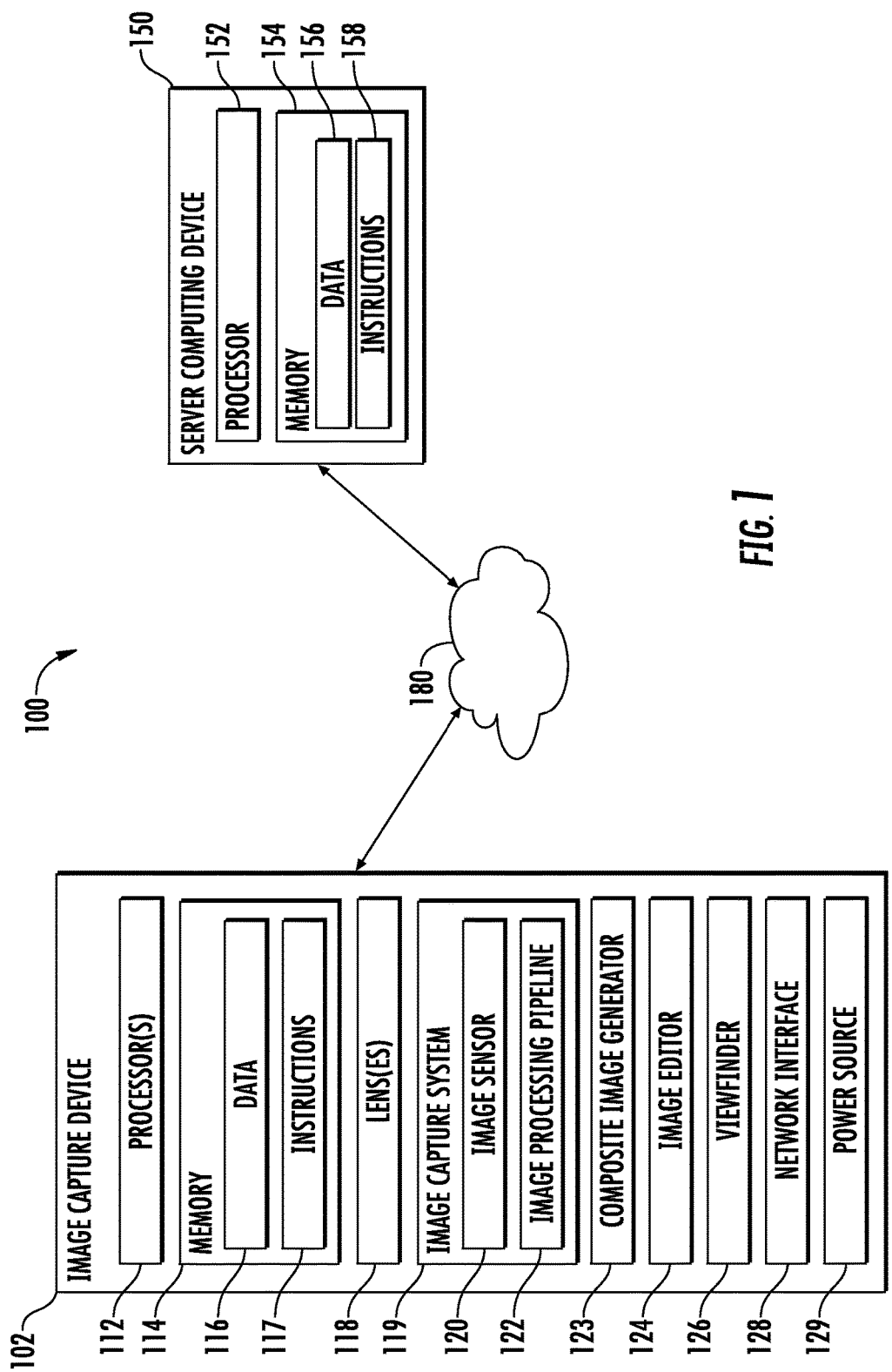
FIG. 1 depicts an example computing system according to example embodiments of the present disclosure.

Example aspects of the present disclosure are directed to image capture devices and associated methods of operation that enable the interactive editing of imagery, including, for example, removal and/or addition of objects from and/or to captured imagery. In particular, according to one example aspect of the present disclosure, an image capture device can capture a plurality of frames of imagery that depict a scene and, while capturing the plurality of frames of imagery, provide a composite image within a viewfinder of the image capture device, where non-stationary objects included in the scene are removed from the composite image. As one example, a novel color-space-based filtering algorithm can be used at each of a plurality of iterations to select pixel values for the composite image that correspond to stationary background objects, thereby removing non-stationary foreground objects from the composite image. For example, the removed non-stationary objects can be visualized within the viewfinder as dissolving over time. According to another example aspect of the present disclosure, the image capture device can allow a user to edit a final composite image directly within the viewfinder. As one example, the user can scroll between the captured frames of imagery and can select certain objects within the frame(s) of imagery to add to and/or remove from the final composite image. For example, the user can provide a touch interaction to directly "paint" certain objects from a particular frame into the final composite image. Thus, the present disclosure provides systems and methods that enable enhanced capture and interactive editing of imagery.

More particularly, an image capture device can include an image capture system configured to capture frames of imagery. For example, the image capture system can include an image sensor and an image processing pipeline. The image capture device can also include a viewfinder configured to display a field of view of the image capture device. As one example, the image capture device can be a dedicated camera such as a digital point and shoot camera. As another example, the image capture device can be a camera-enabled device such as a smartphone or tablet. As a further example, in some implementations, the viewfinder of the image capture device can be a display screen. For example, the display screen can be a touch-sensitive display screen.

The image capture device can be configured to capture a plurality of frames of imagery that depict a scene. As one example, a user can start an image capture process while holding the image capture device steady and/or relatively motionless. For example, one or more guides or other assistance can be provided to help the user hold the device steady. The image capture device can capture the frames of imagery over time until a certain number of frames have been captured, the user ends the capture session, the device is moved more than a threshold amount, and/or some other criterion for ending the image capture process has been met.

While capturing the plurality of frames of imagery and for each of a plurality of iterations, the image capture device can generate a composite image from the plurality of frames of imagery. In particular, according to an aspect of the present disclosure, when generating the composite image, the image capture device can remove one or more non-stationary objects included in the scene from the composite image.

As one example use, a user who is on vacation may typically take a photo of an interesting place (e.g., a landmark). However, the captured photograph typically includes/depicts a significant number of other tourists walking around the scene (e.g., in front of the landmark). By removing one or more non-stationary objects included in the scene from the composite image, the image capture device can allow the user to keep the landmark and the people they want in the scene, while removing all of the other tourists who are moving about.

According to another aspect of the present disclosure, while capturing the plurality of frames of imagery, the image capture device can provide the composite image for display in the viewfinder. For example, the composite image can be iteratively generated from the plurality of frames of imagery while they are being captured and the image capture device can display the composite image within the viewfinder as it is iteratively generated. Thus, the user can see the composite image being generated over time as the plurality of image frames are captured. This can provide the user with improved understanding of what is happening and also a sense of how long to wait until a final composite image is generated.

In some implementations, the image capture device can stabilize frames in real time as they are received. This can include performing feature tracking, aligning the images, and/or stitching the images together. Thus, in some implementations, the frames can be registered to one another so as to have a shared global coordinate system. In some implementations, object recognition and/or object segmentation can be performed on the frames of imagery to detect and/or identify objects depicted within the frames of imagery. For example, object segmentation can assign certain pixels as belonging to or otherwise depicting certain objects.

According to another aspect of the present disclosure, the image capture device can perform a filtering or selection process on the plurality of frames of imagery to generate the composite image. In some implementations, the image capture device can perform a filtering or selection process in real time at each of a plurality of iterations to iteratively generate the composite image. In some implementations, each iteration of the composite image builds on the last while in other implementations each iteration of the composite image is newly generated from the available frames of imagery.

In some implementations, the image capture device can perform a color-space-based filtering algorithm at each of the plurality of iterations to select pixel values for the composite image that correspond to stationary background objects, thereby removing non-stationary foreground objects from the composite image. In particular, as one example, for each of a plurality of pixel positions in the composite image: the image capture device can identify the pixel value from the plurality of frames of imagery that has a shortest distance in a color space to other pixels at such pixel position. The image capture device can select such pixel value for inclusion in the composite image at such pixel position. Stated differently, in some implementations, the image capture device can constantly add frames to a rolling buffer and, for each pixel position in the composite image, can search the buffer to find the color that is most similar to the other pixels in such position. The composite image can be created from the winners of this process. Put another way, the composite image can be created from the pixel values that are identified, for each pixel position, as being most similar in color to the other pixel values in that position in the other image frames.

In other implementations, a median filter or an averaging filter can be used to generate the composite images rather than the particular color space filtering algorithm described above. For example, the median value or mean value of all pixel values at each pixel position can be selected for such pixel position.

According to another aspect of the present disclosure, in some implementations, the removed non-stationary objects can be visualized within the viewfinder as dissolving or dissipating over time. For example, visualization of the non-stationary objects dissolving over time can be an effect provided by the iterative pixel selection/filtering process described above. In particular, as pixel values that correspond to background stationary objects are iteratively selected over time (e.g., because they appear in more frames than the transitory values associated with moving objects), the pixel values that correspond to foreground non-stationary objects are iteratively "removed" or otherwise not chosen for inclusion in the composite image. This can result in the foreground non-stationary objects appearing to dissolve over time as the pixel values that correspond to such objects are not selected over time but are instead replaced with pixel values that correspond to background colors.

Furthermore, in some implementations, one or more edges or outlines of an object currently within the scene can be shown in the composite image. For example, an edge detection algorithm can be used to detect edges and such edges can be emphasized, highlighted, or otherwise shown. However, the actual pixel values for the composite image can be selected as described above, which will cause the objects to dissolve while their edges remain. Thus, one or more non-stationary objects can be visualized as dissolving over time while also retaining an outline of each of the one or more non-stationary objects. This can provide a ghost-like effect as the objects dissolve but their outlines are retained for some period of time, demonstrating to the user that the non-stationary objects are being removed from the scene.

According to another aspect of the present disclosure, the image capture device can allow a user to edit a final composite image directly within the viewfinder. In particular, in some implementations, the image capture device can provide a final composite image for display in the viewfinder at the conclusion of the image capture process. For example, the final composite image can be the current iterative version of the composite image when one or more criteria for ending the image capture process is met. Example criteria for ending the image capture process can include: capturing a predefined number of frames of imagery, reaching the end of a predefined capture period of time, receiving user input that ends the capture process, experiencing motion in the image capture device greater than a threshold amount of motion, an iteration over iteration change in the composite image being less than a threshold amount of change, and/or any other criteria.

The user can then provide a first user input that selects a first frame of imagery from the plurality of frames of imagery. As one example, the image capture device can provide an interactive tool that enables a user to scroll within the plurality of frames of imagery. For example, the interactive tool can be a scroll wheel or a progress bar. The interactive tool can be provided in combination with haptic feedback. For example, switching between each frame can result in one haptic tick, with the beginning and end frames holding greater haptic weight.

Thus, in some implementations, the user can interact with an interactive tool to review the frames of imagery captured during the image capture process. As will be described further below, the user can selectively add certain objects and/or pixel areas from a particular frame of imagery to the composite image. For example, the user can provide a touch interaction to directly "paint" certain objects from a particular frame into the final composite image. As such, in some implementations, the image capture device can further operation in an edit mode that allows users to scroll through the captured frames and paint back in or out the pieces they want, among other things.

In some implementations, when the user reviews the captured frames of imagery, the image capture device can provide each frame of imagery for display within the viewfinder by visually overlaying the frame of imagery upon the final composite image. Thus, as the user reviews the frames of imagery (e.g., by interacting with a scroll wheel), the frame of imagery that is currently being reviewed can be visually overlaid upon the final composite image. This can enable the user to quickly discern differences between the frame of imagery and the final composite image. In other implementations, the frame of imagery is not overlaid upon the final composite image but is instead simply presented in the user interface.

In some implementations, object recognition and/or image comparison can be performed on the frames of imagery to identify objects that are included in or otherwise depicted by each frame of imagery but that are not included in or depicted by the final composite image. The objects included in a frame of imagery but not the final composite image can be shown with highlighting or other visual significance when such frame of imagery is presented so that the user can easily discern which objects are available to be painted into the final composite image. For example, the objects can be shown normally while the remainder of the frame of imagery (i.e., the portions that match the final composite image) can be shown in grey, black, or otherwise visually de-emphasized. As one example, in some implementations, when the paint tool is selected, only the differences between the currently reviewed frame and the final composite image are at full opacity while the rest of the image is at a reduced opacity (e.g., 20%).

According to another aspect of the present disclosure, the image capture device can receive a second user input relative to a location within a frame of imagery present in the user interface. As one example, in some implementations, the user interface can include a paint tool that the user can select to enable "painting" of certain objects from a particular frame into the final composite image. For example, after having scrolled to a particular frame of imagery, the user can select the paint tool and then touch a location in the frame of imagery to paint an object at such location into the final composite image.

In some implementations, the viewfinder is a touch-sensitive display screen; and receiving the second user input relative to the location can include displaying the frame of imagery on the touch-sensitive display screen and receiving a user touch input at a portion of the touch-sensitive display screen where the first location within the first frame of imagery is displayed.

In response to receipt of the second user input, the image capture device can modify the final composite image to include a portion of the frame of imagery at the location at which the second user input was received. As one example, the image capture device can modify the final composite image to depict at least a first non-stationary object depicted at the location in the frame of imagery.

In some implementations, modifying the final composite image can include modifying the final composite image to include a plurality of pixel values associated with the object. Thus, in some implementations, the entire object can be extracted from the frame of imagery and inserted into the final composite image. For example, object segmentation can be performed to identify pixels that correspond to a particular object.

In other implementations, modifying the final composite image can include determining a plurality of pixel values of the frame of imagery that are included within an area around the location associated with the second user input and modifying the final composite image to include the plurality of pixel values. Thus, in some implementations, only an area around the location associated with the user input can be added to the final composite image.

In some implementations, the size of the area can be based on a pressure associated with the user input. For example, if the user presses harder on the touch-sensitive display screen, a smaller radius around the location of the user input can be selected and painted into the final composite image while a softer press can result in a larger radius being selected or vice versa. In some implementations, this can be implemented by modifying the size (e.g., radius) of the paint brush tool based on the pressure of the user touch input.

In some implementations, a magnifying glass tool can be provided for zooming in when the user is selecting content from the frame of imagery. For example, once the user begins providing user input to select a location within a frame of imagery, the user interface can provide a magnified pop out that enlarges the corresponding section of the frame of imagery so that the user can perform more fine-grained painting in of content.

In some implementations, a reset button or functionality can be provided within the user interface. For example, in some implementations, if the user pulls the interactive frame exploration tool all the way to one side (e.g., the right), then any edits made to the final composite image can be undone and the final composite image can be reset.

After the final composite image has been modified to include the content the user selected from one of the frames of imagery, the user can further edit the final composite image or can save the final composite image (e.g., to a camera roll or other gallery or library of the image capture device). For example, in some implementations, the user can scroll to a different frame of imagery and paint a second object included in the different frame of imagery into the final composite image.

The systems and methods of the present disclosure provide a number of technical effects and benefits. As one example technical effect and benefit, the systems and methods of the present disclosure enable reduced usage of limited memory resources. In particular, instead of needing to capture and permanently store a significant number of pictures (e.g., in hopes that a single one of such pictures is desirable), a user can use the systems and methods of the present disclosure to obtain a single, high-quality composite image. Thus, the number of poor quality images that end up being captured and stored can be reduced, thereby preserving memory space.

As another example technical effect and benefit, the systems and methods of the present disclosure provide a color-space-based filtering algorithm that provides improved generation of composite images. In particular, as compared to certain other filtering techniques, the color-space-based filtering algorithm can provide more consistent coloration throughout an image, all while removing non-stationary objects. In addition, the color-space-based filtering algorithm may enable non-stationary objects to be removed from the composite image without needing to actively identify and track the non-stationary objects. The amount of processing that is required may therefore be reduced when compared to a system in which the non-stationary objects are actively identified and/or tracked prior to their removal. The color-space-based filtering algorithm may also be particularly well-suited for implementation using parallel processing. For example, each pixel position can be computed in parallel.

As another example technical effect and benefit, the systems and methods of the present disclosure may enable provision of a final image in which non-stationary objects are more consistently sharper across the image as a whole than they would be if the image had been captured in a conventional manner. This is not least because the representation of the object selected from a single one of the frames may be included in the final image. As such, blurring which might otherwise result from the movement of the object between frames may be avoided. This may be particularly useful for non-stationary objects that are present in substantially the same location in all of the plurality of image frames but are nonetheless non-stationary (e.g. a tree with moving leaves). In some conventional composite capture techniques, at least part of such objects may appear blurred (e.g. the leaves of the tree). However, methods and systems described herein may enable such blurring to be avoided. For example, the systems and methods of the present disclosure can enable a user to select, for each object desired to be included in the final composite image, a frame that includes a sharpest version of such object and select such versions of such object for inclusion in the final composite image. Thus, the sharpest version of each object from among the plurality of image frames can be respectively selected for inclusion in the final composite image.

With reference now to the Figures, example embodiments of the present disclosure will be discussed in further detail.

EXAMPLE DEVICES AND SYSTEMS

FIG. 1 depicts an example computing system 100 according to an example embodiment of the present disclosure. The system 100 is provided as one example system only. The systems, methods, techniques, and principles of the present disclosure can be used in and applied to many different systems in addition or alternatively to the example system 100. For example, in some implementations, the image capture device 102 does not participate in a network 180 with the server computing device 150.

The example system 100 includes at least one image capture device 102. The image capture device 102 can, in some implementations, be mobile and/or able to be worn. For example, the image capture device 102 can be a smartphone, tablet, or other similar device. As another example, the image capture device 102 can be an embedded device and/or a smart device (e.g., smart appliances, smart speakers, home manager devices, assistant devices, security systems, and the like). As another example, the image capture device 102 can be a point and shoot digital camera. The system 100 may also include one or more additional image capture devices and/or a server computing device 150.

The image capture device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. In some implementations, the processor 112 includes a dedicated vision processing platform that delivers high-performance machine vision and visual awareness in a power-constrained environment. For example, the processor 112 can be a system-on-a-chip (SoC) designed for high-performance, low-power computational imaging. In some implementations, the processor 112 includes hardware, software, and/or firmware that is selectively usable to perform a complete image processing pipeline on-chip. In some implementations, the processor 112 includes multiple vector processors optimized for vision processing workloads. In other implementations, the processor 112 is a generic, off-the-shelf processor.

The memory 114 can include one or more non-transitory computer-readable mediums, such as RAM, ROM, EEPROM, EPROM, flash memory devices, magnetic disks, etc., and combinations thereof. In some example implementations, the memory 114 includes at least a first volatile (e.g., DRAM) memory and a second non-volatile memory. For example, the first volatile memory can be used for temporary storage of various types of image data, while the second non-volatile memory can be used for non-temporary storage of various types of image data. For example, the first volatile memory can include a temporary image buffer that stores frames of imagery (e.g., until a final composite image is saved). In some implementations, the non-volatile memory includes a flash memory card. In some implementations, the flash memory card is a Secure Digital (SD) card.

The example image capture device 102 can also include one or more lenses 118 and an image capture system 119. The image capture system 119 can include an image sensor 120 and an image processing pipeline 122. The image sensor 120 can be a sensor that detects incoming light or other electromagnetic radiation and outputs data sufficient to generate an image of a scene. For example, the image sensor 120 can be a CMOS sensor or a CCD sensor. In some implementations, the one or more lenses 118 can include a wide angle lens such that images resulting from data output by the image sensor 120 are wide angle images.

As noted above, the image sensor 120 can output data sufficient to generate images of a scene viewed by the image sensor 120. The image capture device 102 can include various additional components for processing such data from the image sensor 120 to generate such images. As one example, the image capture device 102 can include the image processing pipeline 122. The image processing pipeline 122 can include one or more image processing components that are operable to process the raw data from the image sensor 120 to form image frames. For example, the image processing pipeline 122 can include an image signal processor that includes a number of hardware blocks.

The image capture device 102 can include a viewfinder 126. The viewfinder 126 can display at least a portion of a field of view of the image capture device. In one example, the image capture device 102 can be a camera-enabled device such as a smartphone or tablet and the viewfinder 126 of the image capture device 102 can be a display screen. For example, the display screen can be a touch-sensitive display screen.

The image capture device 102 can further include a composite image generator 123 and an image editor 124. The composite image generator 123 can generate a composite image from a plurality of image frames. For example, the composite image generator 123 can perform any of the techniques described herein to generate the composite image. The image editor 124 can enable a user to edit an image. For example, the image editor 124 can enable a user to maneuver (e.g., scroll) among a plurality of image frames, select a particular image frame, and then paint an object included in the selected image frame into a final composite image. The image editor 124 can perform or enable any of the image editing techniques described herein.

Each of the image capture device composite image generator 123 and the image editor 124 include computer logic utilized to provide desired functionality. Each of the image capture device composite image generator 123 and the image editor 124 can be implemented in hardware, firmware, and/or software controlling a general purpose processor. For example, in some implementations, each of the image capture device composite image generator 123 and the image editor 124 includes program files stored on a storage device, loaded into a memory and executed by one or more processors. In other implementations, each of the image capture device composite image generator 123 and the image editor 124 includes one or more sets of computer-executable instructions that are stored in a tangible computer-readable storage medium such as RAM hard disk or optical or magnetic media.

The image capture device 102 can include a network interface 128. The network interface 128 can include any number of components to provide networked communications (e.g., transceivers, antennas, controllers, cards, etc.). In some implementations, the image capture device 102 includes a first network interface operable to communicate using a short-range wireless protocol, such as, for example, Bluetooth and/or Bluetooth Low Energy, and also a second network interface operable to communicate using other wireless network protocols, such as, for example, Wi-Fi.

The image capture device 102 can further include a power source 129. As one example, the power source 129 can be an on-board battery, such as an on-board lithium-ion battery. The image capture device 102 can also be electrically connectable (e.g., via a micro USB port or other electrical and/or data connection port) to a wall outlet or other source of utility power or other appropriately rated power. Plugging the image capture device 102 into a wall outlet can recharge the on-board battery. In some implementations, the image capture device 102 is configured to transfer images to the server computing device 150 over network 180 or perform other highly energy consumptive tasks only when the image capture device 102 is connected to an external power source, such as a wall outlet.

The system 100 can further include the server computing device 150. In some implementations, the image capture device 102 communicatively connects to the server computing device 150 over a wide area network portion of the network 180. The server computing device 150 can store imagery captured by the image capture device 102 and/or perform various other tasks. The server computing device 150 can operate with the image capture device 102 according to a client-server architecture.

Server computing device 150 can be implemented using one or more server computing devices and can include a processor 152 and a memory 154. In the instance that server computing device 150 consists of multiple server devices, such server devices can operate according to any computing architecture, including a parallel computing architecture, a distributed computing architecture, or combinations thereof.

Processor 152 can be any suitable processing device and can be one processor or a plurality of processors which are operatively connected. Memory 154 can store instructions 158 that cause processor 152 to perform operations to implement the present disclosure.

Network 180 can be any type of communications network, such as a local area network (e.g., intranet), wide area network (e.g., Internet), or some combination thereof and can include any number of wired or wireless links. In general, communication between the server computing device 150 and the image capture device 102 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Server computing device 150 can communicate with image capture device 102 over network 180 by sending and receiving data.

Further, any of the processes, operations, programs, applications, or instructions described as being stored at or performed by the server computing device 150 can instead be stored at or performed by the image capture device 102 in whole or in part, and vice versa. Likewise, any of the processes, operations, programs, applications, or instructions described as being stored at or performed by the image capture device 102 (e.g., including the composite image generator 123 and the image editor 124) can instead be stored at or performed by the server computing device 150 in whole or in part, and vice versa.

Example Methods

Figure 2:
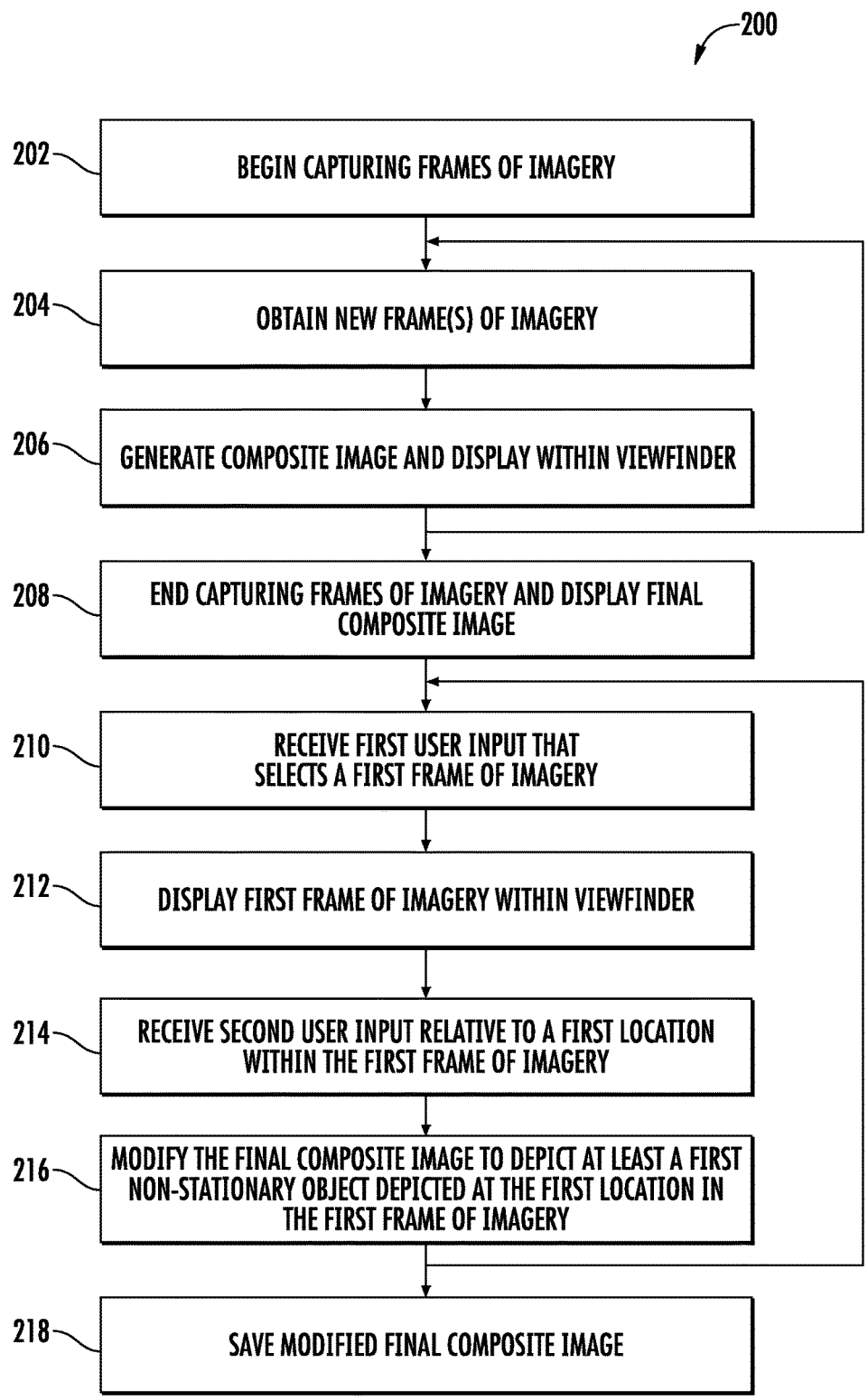
FIG. 2 depicts an example method according to example embodiments of the present disclosure.

FIG. 2 depicts an example method 200 according to example embodiments of the present disclosure. Method 200 can be performed by a computing system. The computing system can include an image capture device. In some implementations, the computing system can include one or more additional computing device in addition to the image capture device (e.g., a server computing device). In other implementations, the computing system includes only the image capture device.

At 202, the computing system can begin capturing frames of imagery. As one example, at 202, a user can open or otherwise cause to be executed an image capture application. The user can press a capture button that indicates a desire to start capturing imagery and/or one or more other criteria can be met such as, for example, sensor data from an image capture device indicating that the image capture device is being held substantially steady. In response, the computing system can begin capturing frames of imagery.

At 204, the computing system can obtain new frame(s) of imagery. At 206, the computing system can generate a composite image. Furthermore, the computing system can display the composite image within a viewfinder of the image capture device. After 206, method 200 can return to 204 and again obtain new frame(s) of imagery.

More particularly, according to an aspect of the present disclosure, while capturing a plurality of frames of imagery, the computing system can provide a composite image within a viewfinder of the image capture device. Thus, as an example, blocks 204 and 206 can be iteratively performed (e.g., as indicated by the recursive arrow leading from the bottom of block 206 to above 204).

In some implementations, blocks 204 and 206 can be iteratively performed for each new frame of imagery that is obtained. In other implementations, blocks 204 and 206 can be iteratively performed for each new set of a certain number of frames of imagery that is obtained. For example, blocks 204 and 206 can be iteratively performed for each new set of five frames that are obtained, ten frames that are obtained, etc. In some implementations, blocks 204 and 206 can be iteratively performed when a certain amount of change in the scene is detected.

In some implementations, the image capture device can stabilize frames in real time as they are received. This can include performing feature tracking, aligning the images, and/or stitching the images together. Thus, in some implementations, the frames can be registered to one another so as to have a shared global coordinate system. In some implementations, object recognition and/or object segmentation can be performed on the frames of imagery to detect and/or identify objects depicted within the frames of imagery. For example, object segmentation can assign certain pixels as belonging to or otherwise depicting certain objects. In some implementations, certain frames that have poor quality (e.g., blurry frames) can be removed through a filtering, anti-blur, or other selection process.

Thus, through iterative performance of blocks 204 and 206, the user can see the composite image being generated over time as the plurality of image frames are captured. This can provide the user with improved understanding of what is happening and also a sense of how long to wait until a final composite image is generated. In some implementations, however, the composite image is not necessarily displayed within the viewfinder but can be displayed in some other fashion (e.g., on a different display device). In yet other implementations, the composite image is not displayed until a final composite image is generated.

According to another aspect of the present disclosure, when generating the composite image at each iteration of block 206, the computing system can remove one or more non-stationary objects included in the scene from the composite image. As one example, the computing system can perform a filtering or selection process on the plurality of frames of imagery to generate the composite image. Thus. in some implementations, the computing system can perform a filtering or selection process in real time at 206 to generate the composite image.

In some implementations, at each iteration of 206, the computing system can perform a color-space-based filtering algorithm to select pixel values for the composite image that correspond to stationary background objects, thereby removing non-stationary foreground objects from the composite image. In particular, as one example, for each of a plurality of pixel positions in the composite image: the computing system can identify the pixel value from the plurality of frames of imagery that has a shortest distance in a color space to other pixel values at such pixel position. The computing system can select such pixel value for inclusion in the composite image at such pixel position.

Stated differently, in some implementations, the computing system can constantly add frames to a rolling buffer and, for each pixel position in the composite image, can search the buffer to find the color that is most similar to the other pixels in such position. The composite image can be created from the winners of this process. Put another way, the composite image can be created from the pixel values that are identified, for each pixel position, as being most similar in color to the other pixel values in that position in the other image frames. In some implementations, the rolling buffer includes all captured image frames, while in other implementations, the rolling buffer includes only a certain number of the most recently captured image frames.

Figure 3:
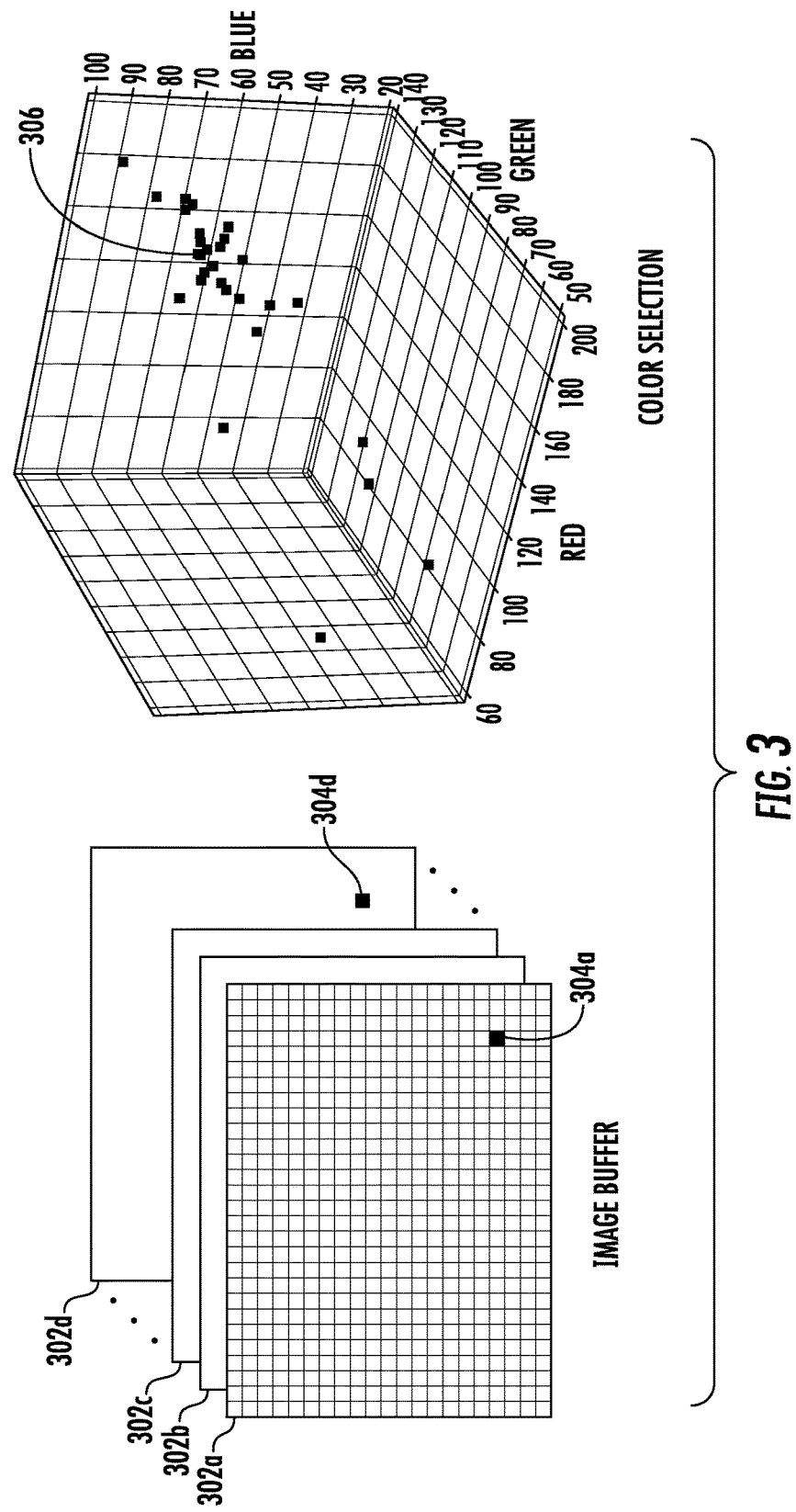
FIG. 3 depicts a graphical diagram of an example color space filtering algorithm according to example embodiments of the present disclosure.

As one example illustration, FIG. 3 depicts a graphical diagram of an example color space filtering algorithm according to example embodiments of the present disclosure. In particular, on the left-hand side, FIG. 3 illustrates a plurality of image frames 302a, 302b, 302c, 302d. Although four frames are illustrated, they are representative of any number of captured frames (e.g., tens or hundreds of frames).

Each of the frames 302a, 302b, 302c, 302d has a plurality of pixel positions. In some implementations, all frames 302a-d include the same set of pixel positions, while in other implementations some frames share some locations while other frames share other locations (e.g., due to movement of the image capture device during image capture). As one example, each pixel position can be expressed as an (x,y) coordinate position in a global coordinate system that is shared among the frames 302a-d.

Each frame 302a-d can provide a respective pixel value for each pixel position included in such frame. For example, each pixel value can be expressed in a color space such as, for example, RGB, RGBA, CMYK, HSV, HSL, and/or other color spaces. To provide one example, for a particular pixel position, frame 302a provides pixel value 304a while, at the same pixel position, frame 302d provides pixel value 304d.

For each of a plurality of pixel positions in the composite image, the computing system can identify the pixel value from the plurality of frames of imagery 302a-d that has a shortest distance in a color space to other pixel values at such pixel position. The computing system can select such pixel value for inclusion in the composite image at such pixel position.

As one example, on the right-hand side, FIG. 3 illustrates all of the pixel values that share a same pixel position in the frames of imagery. In particular, the pixel values are illustrated as being distributed in a three-dimensional color space. The computing system can determine, for each pixel value in the distribution, its cumulative distance to the other pixel values included in the distribution. The pixel value with the smallest cumulative distance can be selected and used at such pixel position in the composite image. For example, for this particular pixel position, pixel value 306 has been determined to have the shortest distance in the illustrated color space to the other pixel values in the illustrated distribution. Thus, the composite image can have pixel value 306 at the corresponding pixel position.

Referring again to block 206 of FIG. 2, in other implementations, a median filter or an averaging filter can be used to generate the composite images rather than the particular color space filtering algorithm described above. For example, the median value or mean value of all pixel values at each pixel position can be selected for such pixel position.

According to another aspect of the present disclosure, in some implementations, the removed non-stationary objects can be visualized at 206 within the viewfinder as dissolving or dissipating over time. For example, visualization of the non-stationary objects dissolving over time can be an effect provided by the iterative pixel selection/filtering process described above. In particular, as pixel values that correspond to background stationary objects are iteratively selected over time (e.g., because they appear in more frames than the transitory values associated with moving objects), the pixel values that correspond to foreground non-stationary objects are iteratively "removed" or otherwise not chosen for inclusion in the composite image. This can result in the foreground non-stationary objects appearing to dissolve over time as the pixel values that correspond to such objects are not selected over time but are instead replaced with pixel values that correspond to background colors.

Furthermore, in some implementations, one or more edges or outlines of an object currently within the scene can be shown in the composite image at 206. For example, an edge detection algorithm can be used to detect edges and such edges can be emphasized, highlighted, or otherwise shown. However, the actual pixel values for the composite image can be selected as described above, which will cause the objects to dissolve while their edges remain. Thus, one or more non-stationary objects can be visualized as dissolving over time while also retaining an outline of each of the one or more non-stationary objects. This can provide a ghost-like effect as the objects dissolve but their outlines are retained for some period of time, demonstrating to the user that the non-stationary objects are being removed from the scene.

At 208, the computing system can end capturing frames of imagery and display a final composite image (e.g., within the viewfinder). In particular, in some implementations, the computing system can provide a final composite image for display in the viewfinder at the conclusion of the image capture process. For example, the final composite image can be the current iterative version of the composite image when one or more criteria for ending the image capture process is met. Example criteria for ending the image capture process can include: capturing a predefined number of frames of imagery, reaching the end of a predefined capture period of time, receiving user input that ends the capture process, experiencing motion in the image capture device greater than a threshold amount of motion, an iteration-over-iteration change in the composite image being less than a threshold amount of change, and/or any other criteria.

According to another aspect of the present disclosure, the computing system can allow a user to edit the final composite image directly within the viewfinder. In particular, at 210, the computing system can receive a first user input that selects a first frame of imagery from the plurality of frames of imagery. As one example, the image capture device can provide an interactive tool that enables a user to scroll within the plurality of frames of imagery. For example, the interactive tool can be a scroll wheel or a progress bar. The interactive tool can be provided in combination with haptic feedback. For example, switching between each frame can result in one haptic tick, with the beginning and end frames holding greater haptic weight.

Thus, in some implementations, the user can interact with an interactive tool to review the frames of imagery captured during the image capture process. At 210, the computing system can receive this user input which selects (e.g. scrolls to) the first frame of imagery.

At 212, the computing system can display the first frame of imagery (e.g., within the viewfinder). In some implementations, when the user reviews the captured frames of imagery, the computing system can provide each frame of imagery for display within the viewfinder by visually overlaying the frame of imagery upon the final composite image. Thus, as the user reviews the frames of imagery (e.g., by interacting with a scroll wheel), the frame of imagery that is currently being reviewed can be visually overlaid upon the final composite image. This can enable the user to quickly discern differences between the frame of imagery and the final composite image. In other implementations, the frame of imagery is not overlaid upon the final composite image but is instead simply presented in the user interface.

In some implementations, object recognition and/or image comparison can be performed on the frames of imagery to identify objects that are included in or otherwise depicted by each frame of imagery but that are not included in or depicted by the final composite image. The objects included in a frame of imagery but not the final composite image can be shown with highlighting or other visual significance when such frame of imagery is presented so that the user can easily discern which objects are available to be painted into the final composite image. For example, the objects can be shown normally while the remainder of the frame of imagery (i.e., the portions that match the final composite image) can be shown in grey, black, or otherwise visually de-emphasized. As one example, in some implementations, when the paint tool is selected, only the differences between the currently reviewed frame and the final composite image are at full opacity while the rest of the image is at a reduced opacity (e.g., 20%).

At 214, the computing system can receive a second user input relative to a first location within the first frame of imagery. As one example, in some implementations, the user interface can include a paint tool that the user can select to enable "painting" of certain objects from a particular frame into the final composite image. For example, after having scrolled to the first frame of imagery, the user can select the paint tool and then touch a first location in the first frame of imagery to paint an object at such location into the final composite image.

In particular, in some implementations, the viewfinder is a touch-sensitive display screen; and receiving the second user input relative to the location can include displaying the frame of imagery on the touch-sensitive display screen and receiving a user touch input at a portion of the touch-sensitive display screen where the first location within the first frame of imagery is displayed. However, other input devices (e.g., mouse, trackball, etc.) can be used to provide the second user input in addition or alternatively to the touch-sensitive display screen.

In response to receipt of the second user input, the image capture device can modify the final composite image to include a portion of the first frame of imagery from the first location at which the second user input was received. As one example, the image capture device can modify the final composite image to depict at least a first non-stationary object depicted at the first location in the first frame of imagery.

In some implementations, modifying the final composite image can include modifying the final composite image to include a plurality of pixel values associated with the object. Thus, in some implementations, the entire object can be extracted from the frame of imagery and inserted into the final composite image. For example, object segmentation can be performed to identify pixels that correspond to a particular object.

In other implementations, modifying the final composite image can include determining a plurality of pixel values of the frame of imagery that are included within an area around the first location associated with the second user input and modifying the final composite image to include the plurality of pixel values. Thus, in some implementations, only an area around the location associated with the user input can be added to the final composite image.

In some implementations, a magnifying glass tool can be provided for zooming in when the user is selecting content from the frame of imagery. For example, once the user begins providing user input to select a location within a frame of imagery, the user interface can provide a magnified pop out that enlarges the corresponding section of the frame of imagery so that the user can perform more fine-grained painting in of content.

At 216, the computing system can modify the final composite image to depict at least a first non-stationary object depicted at the first location in the first frame of imagery. Thus, in response to receipt of the second user input, the image capture device can modify the final composite image to include a portion of the first frame of imagery from the location at which the second user input was received.

In some implementations, modifying the final composite image can include modifying the final composite image to include a plurality of pixel values associated with the object. Thus, in some implementations, the entire object can be extracted from the frame of imagery and inserted into the final composite image. For example, object segmentation can be performed to identify pixels that correspond to a particular object.

In other implementations, modifying the final composite image can include determining a plurality of pixel values of the frame of imagery that are included within an area around the location associated with the second user input and modifying the final composite image to include the plurality of pixel values. Thus, in some implementations, only an area around the location associated with the user input can be added to the final composite image.

In some implementations, the size of the area can be based on a pressure associated with the user input. For example, if the user presses harder on the touch-sensitive display screen, a smaller radius around the location of the user input can be selected and painted into the final composite image while a softer press can result in a larger radius being selected or vice versa. In some implementations, this can be implemented by modifying the size (e.g., radius) of the paint brush tool based on the pressure of the user touch input.

In some implementations, a reset button or functionality can be provided within the user interface. For example, in some implementations, if the user pulls the interactive frame exploration tool all the way to one side (e.g., the right), then any edits made to the final composite image can be undone and the final composite image can be reset.

After the final composite image has been modified to include the content the user selected from one of the frames of imagery, the user can further edit the final composite image. For example, this is indicated by the regressive arrow extending from the bottom of block 216 to the top of block 210. For example, in some implementations, the user can scroll to a different frame of imagery and paint a second object included in the different frame of imagery into the final composite image.

Alternatively, at 218, the computing system can save the modified final composite image. For example, the modified final composite image can be saved to a non-volatile memory. For example, the modified final composite image can be saved to a camera roll or other gallery or library of the image capture device.

FIGS. 4A-D depict example user interfaces according to example embodiments of the present disclosure. In particular, FIGS. 4A-D provides illustrations of example user interfaces provided as part of an example implementation of the process described by blocks 210-216. The user interfaces of FIGS. 4A-D are provided as one example only. Many different user interfaces with different arrangements, icons, tools, layouts, etc. can be used to perform the present disclosure.

Figure 4B:
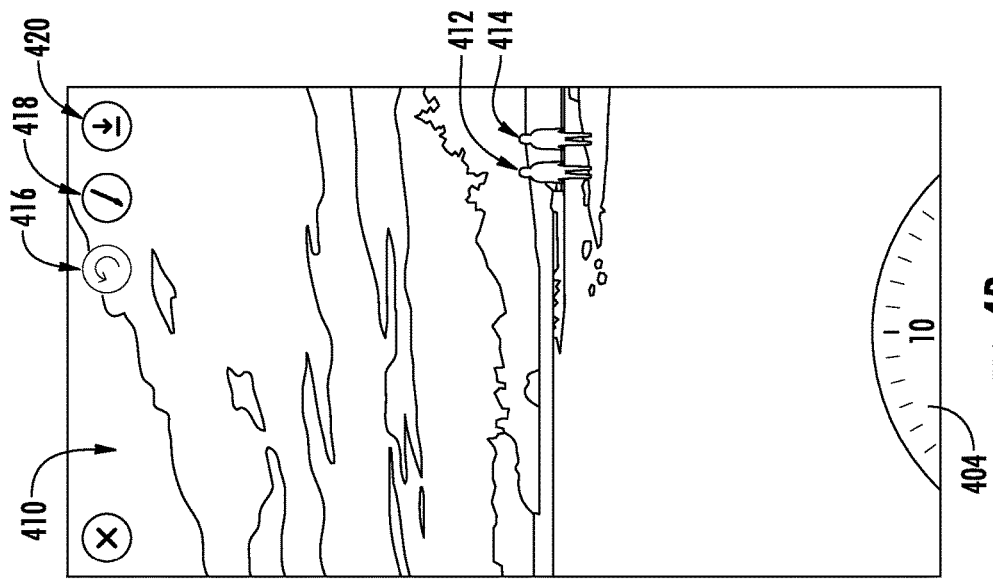
Figure 4A:
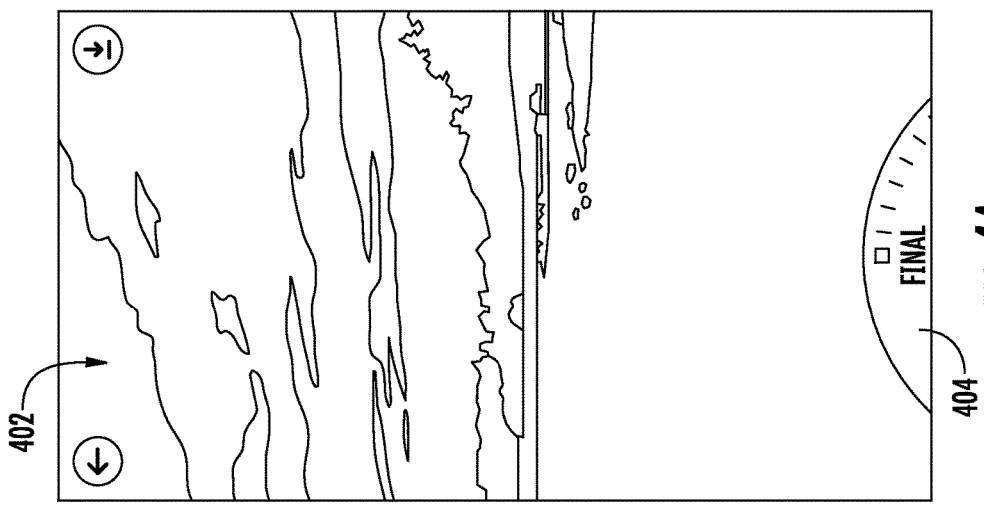

Referring first to FIG. 4A, the user interface of FIG. 4A displays a final composite image 402 generated from a plurality of frames of imagery. Notably, in this example, no persons are depicted in the final composite image 402.

The user interface of FIG. 4A further includes a scroll wheel 404 that enables a user to scroll back through the plurality of frames of imagery. Other interactive tools can be provided in addition or alternatively to a scroll wheel. For example, a scrubbing bar can be used in addition or alternatively to the scroll wheel 404.

In particular, referring now to FIG. 4B, the user has interacted with the scroll wheel 404 to scroll to the tenth image frame 410 (e.g., as indicated by the number ten on the scroll wheel 404). Notably, in this example, the image frame 410 depicts two persons standing in the scene, a first person 412 and a second person 414.

Once the user has begun the editing process (e.g., by scrolling to a particular frame of imagery), the user interface can provide a number of tools that the user can select and use to edit the image. For example, the user interface of FIG. 4B includes a paint icon 418. The user can select the paint icon 418 and can then interact with the user interface to select certain portions of the displayed image frame 410 (e.g., those corresponding to a particular object such as person 412) to be "painted" into or otherwise included in the final composite image 402.

As illustrated in FIG. 4B, the user interface can further include an undo tool 416 that allows the user to undo or otherwise reverse a previous action and a download tool 420 that allows the user to download a certain image (e.g., the final composite image 402 and/or a selected frame of imagery such as image frame 410).

Referring now to FIG. 4C, FIG. 4C illustrates the user selecting person 412 for inclusion in the final composite image. For example, in some implementations, the user can touch (e.g., tap) the person 412. In other implementations, the user can draw an outline around the person 412 or can outline and fill (that is, touch all areas desired to be included) the person 412 to select portions of the image frame 410 that correspond to the person 412.

In response to the user input illustrated in FIG. 4C, the person 412 can be added to the final composite image 402. In particular, referring now to FIG. 4D, it can be seen that the person 412 has been added to the final composite image 402. Notably, however, since the user did not select the person 414 from the image frame 410, the person 414 is not included in the final composite image 402.

Figure 5:
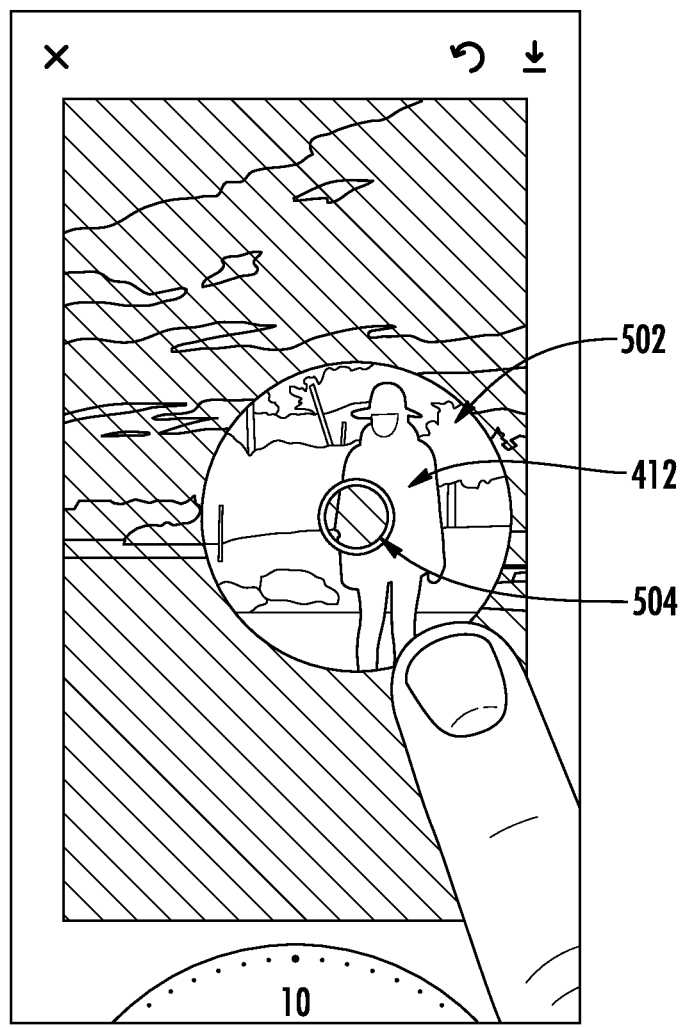
FIG. 5 depicts an example user interface according to example embodiments of the present disclosure.

FIG. 5 depicts an example user interface according to example embodiments of the present disclosure. In particular, FIG. 5 depicts an example implementation in which the user can be assisted in painting certain portions of the image frame by providing of a magnifying glass 502 in the user interface. The magnifying glass 502 can be a portion of the user interface that is provided whenever user input is received. The magnifying glass 502 can magnify a portion of the image frame that is being edited by the user (e.g., the portion that includes the location where the user is providing input).

Providing the magnifying glass 502 can allow the user to paint or otherwise select more granular details such as, for example, specific portions or outlines of an object (e.g., the person 412 as illustrated in FIG. 5). A paint brush 504 can be illustrated at the particular location where the user is actually providing input and, in some implementations, can be shown as a circle as illustrated in FIG. 5. In some implementations, the radius of the paint brush 504 can be dependent upon a magnitude of a pressure associated with the user input.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

What is claimed is:

1. An image capture device, comprising:
an image capture system configured to capture frames of imagery;
a viewfinder configured to display at least a portion of a field of view of the image capture device;
one or more processors; and
one or more non-transitory computer-readable media that collectively store instructions that when executed by the one or more processors cause the image capture device to perform operations, the operations comprising:
capturing a plurality of frames of imagery over a period of time that depict a scene; and
while capturing the plurality of frames of imagery and during the period of time, and for each of the plurality of frames of imagery as such frame of imagery is captured:
receiving the frame of imagery;
upon receipt of the frame of imagery, updating a composite image based on the frame of imagery of the plurality of frames of imagery, wherein updating the composite image comprises:
detecting one or more edges in the frame of imagery that are associated with one or more non-stationary objects included in the scene; and
removing from the composite image the one or more non-stationary objects included in the scene; and
providing the composite image for display in the viewfinder, wherein the composite image depicts the one or more edges but not the one or more non-stationary objects.

2. The image capture device of claim 1, wherein removing from the composite image the one or more non-stationary objects included in the scene comprises, for each of a plurality of pixel positions in the composite image:
identifying a first pixel value from a first frame of imagery of the plurality of frames of imagery that has a shortest distance in a color space to the other pixel values at such pixel position for the other frames of imagery; and
selecting the first pixel value for inclusion in the composite image at such pixel position.

3. The image capture device of claim 1, wherein providing the composite image for display in the viewfinder comprises visualizing the one or more non-stationary objects dissolving over time.

4. The image capture device of claim 3, wherein visualizing the one or more non-stationary objects dissolving over time comprises visualizing the one or more non-stationary objects dissolving over time while also displaying an outline of each of the one or more non-stationary objects.

5. The image capture device of claim 1, wherein the operations further comprise:

receiving a first user input that selects a first frame of imagery from the plurality of frames of imagery;

providing the first frame of imagery for display within the viewfinder;

receiving a second user input relative to a first location within the first frame of imagery; and in response to receipt of the second user input, modifying a final composite image to depict at least a first non-stationary object depicted at the first location in the first frame of imagery.

6. The image capture device of claim 5, wherein the operations further comprise:

performing object segmentation on the first frame of imagery to identify a plurality of pixel values associated with the first non-stationary object in the first frame of imagery;

wherein modifying the final composite image to depict at least the first non-stationary object depicted at the first location in the first frame of imagery comprises modifying the final composite image to include the plurality of pixel values associated with the first non-stationary object.

7. The image capture device of claim 5, wherein modifying the final composite image to depict at least the first non-stationary object depicted at the first location in the first frame of imagery comprises:

determining a plurality of pixel values of the first frame of imagery that are included within an area around the first location associated with the second user input; and modifying the final composite image to include the plurality of pixel values.

8. The image capture device of claim 5, wherein:

the viewfinder comprises a touch-sensitive display screen; and receiving the second user input relative to the first location comprises:

displaying the first frame of imagery on the touch-sensitive display screen; and receiving a user touch input at a portion of the touch-sensitive display screen where the first location within the first frame of imagery is displayed.

9. The image capture device of claim 8, wherein receiving the first user input that selects the first frame of imagery from the plurality of frames of imagery comprises:

receiving the first user input via an interactive tool that enables a user to scroll within the plurality of frames of imagery, wherein the first user input comprises a scroll input that scrolls to the first frame of imagery.

10. The image capture device of claim 5, wherein providing the first frame of imagery for display within the viewfinder comprises visually overlaying the first frame of imagery upon the final composite image.

11. The image capture device of claim 5, wherein providing the first frame of imagery for display within the viewfinder comprises visually highlighting at least the first non-stationary object depicted by the first frame of imagery.

12. The image capture device of claim 1, wherein the operations further comprise:

providing a final composite image for display in the viewfinder;

receiving a user input relative to a first location within the final composite image; and in response to receipt of the user input, modifying the final composite image to depict at least a first non-stationary object of the one or more non-stationary objects at the first location.

13. One or more non-transitory computer-readable media that collectively store instructions that when executed by one or more processors of a computing system cause the computing system to perform operations, the operations comprising:

obtaining a plurality of frames of imagery that depict a scene;

generating a final composite image, wherein generating the final composite image comprises removing from the final composite image non-stationary objects included in the scene, and wherein removing from the final composite image non-stationary objects included in the scene comprises, for each of a plurality of pixel positions in the final composite image:

identifying a first pixel value from a first frame of imagery of the plurality of frames of imagery that has a shortest distance in a color space to the other pixel values at such pixel position for the other frames of imagery; and selecting the first pixel value for inclusion in the final composite image at such pixel position;

receiving a first user input that selects a first frame of imagery from the plurality of frames of imagery;

providing the first frame of imagery for display;

receiving a second user input relative to a first location within the first frame of imagery; and in response to receipt of the second user input, modifying the final composite image to depict at least a first non-stationary object depicted at the first location in the first frame of imagery.

14. The one or more non-transitory computer-readable media of claim 13, wherein:

obtaining the plurality of frames of imagery comprises capturing the plurality of frames of imagery; and generating the final composite image comprises, while capturing the plurality of frames of imagery and for each of a plurality of iterations:

generating an intermediate composite image from the plurality of frames of imagery, wherein generating the intermediate composite image comprises removing from the composite image one or more non-stationary objects included in the scene; and providing the intermediate composite image for display.

15. The one or more non-transitory computer-readable media of claim 14, wherein providing the intermediate composite image for display comprises displaying the generation of the intermediate composite image, wherein displaying the generation of the intermediate composite image comprises visualizing the one or more non-stationary objects dissolving over time.

16. An apparatus comprising: one or more processors; and one or more non-transitory computer-readable media that collectively store instructions that when executed by the one or more processors cause the apparatus to:

obtain a plurality of image frames depicting a scene;

for each of plural pixel positions in the image frames of the plurality of image frames, identify a pixel value at the pixel position in one of the image frames of the plurality of image frames that is the most similar in color to pixel values at the pixel position in the other image frames of the plurality of image frames, wherein the pixel value at the pixel position in the one of the image frames that is most similar in color to the pixel values at the pixel position in the other image frames is that which has a shortest distance in color space to the pixel values at the pixel position in the other image frames; and generate a composite image using the pixel values identified for each of the plural pixel positions.

17. The apparatus of claim 16, wherein the instructions, when executed by the one or more processors, cause the apparatus, while the plurality of images is being obtained, to iteratively:

identify the pixel values and generate the composite image based on the image frames of the plurality of images that have already been obtained.

18. The apparatus of claim 17, wherein the instructions, when executed by the one or more processors, cause the apparatus to:

render the iteratively generated composite image for display while the plurality of images is being obtained.

19. The apparatus of claim 18, wherein the instructions further cause the apparatus, while the plurality of images is being obtained, to iteratively detect one or more edges, and wherein the iteratively generated composite image depicts the one or more edges.

\* \* \* \* \*